(12) United States Patent
Larsson

(10) Patent No.: US 6,574,322 B1
(45) Date of Patent: Jun. 3, 2003

(54) METHOD TO PROVIDE AND PERFORM A TELEPHONE SERVICE

(75) Inventor: Conny Larsson, Stallarholmen (SE)

(73) Assignee: Teligent AB, Nynashamn (SE)

( * ) Notice: Subject to any disclaimer, the term of this patent is extended or adjusted under 35 U.S.C. 154(b) by 0 days.

(21) Appl. No.: 09/284,260

(22) PCT Filed: Oct. 2, 1997

(86) PCT No.: PCT/SE97/01657

§ 371 (c)(1), (2), (4) Date: Jun. 28, 1999

(87) PCT Pub. No.: WO98/16071

PCT Pub. Date: Apr. 16, 1998

(30) Foreign Application Priority Data

Oct. 10, 1996 (SE) ............................................. 9603709
Nov. 14, 1996 (SE) ............................................. 9604173

(51) Int. Cl.[7] ................................................. H04M 3/42
(52) U.S. Cl. ............................... 379/207.02; 379/201.05
(58) Field of Search ...................... 379/201.01–201.07, 379/207.02–207.15, 211.01, 211.02; 717/107, 144, 162

(56) References Cited

U.S. PATENT DOCUMENTS

| | | | | |
|---|---|---|---|---|
| 4,788,720 A | * | 11/1988 | Brennan et al. | 379/201.04 |
| 4,812,843 A | * | 3/1989 | Champion et al. | 340/7.48 |
| 5,329,578 A | * | 7/1994 | Brennan et al. | 379/196 |
| 5,425,090 A | | 6/1995 | Orriss | 379/221.08 |

FOREIGN PATENT DOCUMENTS

| | | |
|---|---|---|
| SE | 502275 | 9/1995 |
| SE | 503129 | 4/1996 |
| SE | 504100 | 11/1996 |
| WO | 9211724 | 7/1992 |
| WO | 9629830 | 9/1996 |

* cited by examiner

Primary Examiner—Benny Q. Tieu
(74) Attorney, Agent, or Firm—Birch, Stewart, Kolasch & Birch, LLP

(57) ABSTRACT

A method of providing and performing a telephone service, in which a computer system senses a calling subscriber number, and in which the computer system is constructed to perform a telephone service ordered by the subscriber of the calling subscriber number, in accordance with a data program. The invention is characterized in that the computer system includes a storage device which is caused to contain a predetermined number of transactions in the form of parts of a data program; in that the computer system fetches from the storage device a number of transactions which together form a data program for performing said service; in that when the subscriber orders a service, the service is stored in the form of codes that correspond to certain transactions from a multitude of transactions; in that said codes are caused to be stored in affiliation with the subscriber number, and in that when the subscriber number is sensed, or read, the computer system is caused to fetch said transactions through the medium of said codes and to execute said transactions and therewith perform said service.

18 Claims, 1 Drawing Sheet

US 6,574,322 B1

METHOD TO PROVIDE AND PERFORM A TELEPHONE SERVICE

This application is the national phase under 35 U.S.C. §371 of PCT International Application No. PCT/SE97/01657 which has an International filing date of Oct. 2, 1997 designated the United States of America.

BACKGROUND OF THE INVENTION

There are many different commercially available telephone subscriber services. Examples of such services are call forwarding services, automatic recall services, the possibility of speaking-in messages and then monitoring the messages, transmitting data via the telephone network, and so on.

Such services are currently performed by executing a data program. The call forwarding service can be mentioned by way of example. In this case, the subscriber orders the service by dialling a code on his/her telephone, followed by the number to which calls shall be forwarded. In the case of Swedish subscribers, the subscriber will dial *21*123456789# when incoming calls shall be forwarded to the number 123456789. The subscriber has herewith caused the telephone exchange to execute a data program when an incoming call is connected to the number from which the service was ordered, this program detecting that a call has been connected to this latter number and reconnecting the call to the number 123456789 instead.

There is thus found for each available service a data program which is common to all those who subscribe to the service in question. This excludes the possibility of performing individual services.

The creation of a new service takes a long time to accomplish, since it entails the creation of an entirely new service.

SUMMARY OF THE INVENTION

The present invention avoids these drawbacks and provides a method which enables individual services to be created, and which also enables individual services and standard services to be created in a short period of time.

The present invention thus relates to a method of providing and performing a telephone service in which a computer system reads a calling subscriber number, said computer system being designed to perform a telephone service ordered by the subscriber of the calling number in accordance with a data program, and wherein the method is characterized in that the computer system includes a memory, or storage device, which is caused to contain a predetermined number of transactions, in the form of parts of a data program; in that the computer system collects from the storage device a number of transactions which together form a data program for performing said service; in that when the subscriber orders a service, the service is stored in the form of codes that correspond to certain transactions from a multiple of transactions; and in that said codes are caused to be stored in affiliation with said subscriber number; and in that when the subscriber number is read, the computer system is caused to fetch the transactions via said codes and to execute said transactions, thereby performing the service.

BRIEF DESCRIPTION OF THE DRAWING

The invention will now be described in more detail with reference to an exemplifying embodiment thereof and also with reference to the accompanying drawing, in which.

DETAILED DESCRIPTION OF THE INVENTION

Figure 1:
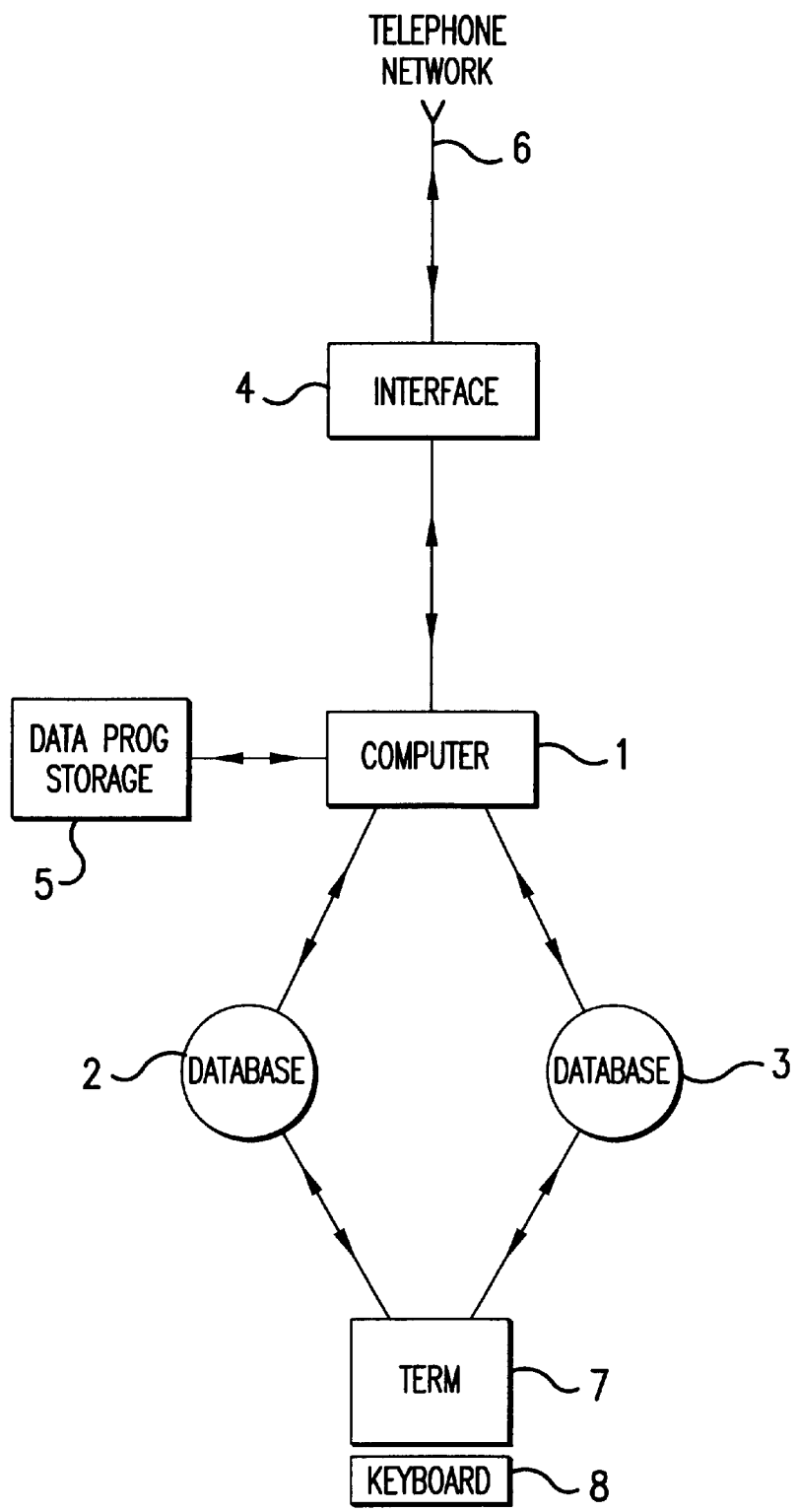
FIG. 1 is a block diagram which illustrates schematically a conceivable software set-up.

FIG. 1 illustrates schematically a computer system for providing and performing a telephone service. The computer system includes one or more computers 1 connected to one or more databases, such as a first database 2 and a second database 3. The reference numeral 4 identifies an interface between the computer system and a fixed telephone network and/or a mobile telephone network. The computer system is constructed to read a calling subscriber number, which enters the system via the interface 4. The computer system is also constructed to perform a telephone service ordered by the subscriber of the calling telephone number, in accordance with a data program. This data program and the requisite operative system are stored, for instance, in a storage device 5 connected to the computer 1.

In accordance with the invention, the computer system includes a first storage device 2 which is caused to contain a predetermined number of so-called transactions in the form of parts of a data program. In the present context, a transaction implies a program instruction or statement which upon execution in the computer 1 means that it performs a function. Functions are exemplified below, although the function may, e.g., be one of receiving an incoming call, of forwarding the call, of sending a query to the calling subscriber in the form of a voice message, where the subscriber can answer by selective depression of a given digit on the telephone keypad, etc.

According to the invention, the computer system is also constructed to fetch from the storage device 2 a number of transactions that together form a data program for performing said service. Superordinate data programs and operative systems may, of course, be stored in the storage device 5. What is meant by the transactions together forming a data program is that the transactions constitute program instructions which in coaction with a superordinate data program cause one of the programs defined by the transactions to be executed. In the present case, this means that a service defined by the transactions will be performed.

When a subscriber orders a service, the service ordered is stored in the form of codes that correspond to certain transactions among the multitude of transactions that are available. These codes are caused to be stored in the second database in the second storage device 3 in affiliation with the subscriber number.

The codes may, for instance, comprise a number series, such as TRS 1, TRS 2, TRS 3 . . . TRS n, where TRS stands for transaction.

When a calling subscriber number from the telephone network 6 is read, the computer system is caused to fetch transactions via said codes and execute these transactions and therewith perform the service.

In so doing, the computer system will preferably first read the calling subscriber number and then collect the codes stored together with the subscriber number in the database 3. The computer then fetches those transactions that are corresponded by the codes in the database 2, these transactions being in the form of program instructions. The program is executed subsequent hereto.

According to one preferred embodiment of the invention, the computer system is caused to analyze the service profile belonging to a read subscriber number. As described above, this is accomplished simply by the computer fetching from the second database 3 those codes TRS n, . . . TRS m, that belong to the read subscriber number.

According to a further preferred embodiment of the invention, the computer system is caused to analyze the service profile that belongs to an individual code given to the computer system by the subscriber. This can be achieved, for instance, by the computer system first reading the calling subscriber number and then sending to the subscriber a voice message asking the subscriber to choose one of the services ordered by the subscriber, by pressing on the keypad of his/her telephone a button corresponding to the service required. In this embodiment, the computer system is thus caused to collect and execute one of two or more service profiles connected to one and the same subscriber number.

Listed below are a number of codes and corresponding transaction implications when the service performed is a call forwarding service, for instance.

TABLE 1

| Code | Implication of the Transactions |
| --- | --- |
| TRS 1 | Lift the receiver. |
| TRS 2 | Sense the calling subscriber number. |
| TRS 3 | Read the service profile of the calling number. |
| TRS 37 | Connect the service to telephone number xxxx in accordance with the service profile. |
| TRS 42 | Wait 30 seconds for a reply. |
| TRS 38 | Connect the service to telephone number yyyy in accordance with the service profile. |
| TRS 42 | Wait 30 seconds for a reply. |
| TRS 5 | Replace the receiver. |

By fetching the above transactions, the computer system thus performs a service in which if the subscriber does not reply, the service is initiated with TRS 1. The call is then forwarded first to telephone number xxxx and then to telephone number yyyy after 30 seconds. The call is terminated in the absence of any reply.

When a subscriber requires a service that solely involves call forwarding, i.e. the service provided in the existing Swedish fixed network, the service is performed through the transactions TRS 1, TRS 2, TRS 3, TRS 37, TRS 5.

This exemplifies the ease in which a service can be changed simply by giving those codes of the transactions required to perform the service from a plurality of transactions.

In order to be able to combine the collected transactions selectively, the transactions are compatible with one another and also with the computer system, i.e. can be combined in any desired order and still be executed by the computer system.

The present invention also enables a subscriber to call the system from any chosen telephone and by giving a personal code and the telephone number of the telephone used forward calls that are coupled to the subscribers own telephone to the aforesaid telephone used by the subscriber at that moment in time.

It is evident that with a large number of different transactions, it is possible to provide a great variety of services, such as individual services.

A subscriber wishing to activate a service, can dial the telephone number of the aforesaid system. According to one alternative, the subscriber can instigate a call forwarding service from his/her telephone to the aforesaid system through the existing call forwarding service in the fixed network.

According to another alternative, the subscriber's telephone is connected to the system either directly or indirectly. In this case, a call outgoing from the subscriber can be set-up to any desired telephone number, by the subscriber dialling the number desired. When the subscriber wishes to use a service, he/she may dial a prefix or another code prior to dialling a number.

It is thus obvious that the skilled person can choose a suitable solution as to how a given subscriber shall be in contact or come into contact with the aforesaid system.

According to one preferred embodiment of the invention, certain transactions include information that does not constitute program instructions or program statements.

Such transactions will preferably include voice information which can be heard by the subscriber or some other upon execution of the service. This may concern voice messages relating to information, e.g. weather information, news, recorded messages, and so on.

According to another preferred embodiment of the invention, one or more services are caused to include one or more time windows within which the services are different to those within other time windows. For instance, a call forwarding service can be performed to different telephone numbers depending on date, day of the week and/or time. Another example is when all foreign calls on the subscriber's telephone are inhibited during certain times.

As before mentioned, the services available are very large in number and also individual. A call forwarding service has been described above by way of example. Examples of other services include all of those services that are currently provided in the Swedish fixed network and an individual modification of these services, remote control of electric apparatus, such as switching-on heat in holiday or leisure residences, alarm call services, data transmission services, etc., etc. It is not possible to count all of the services that are conceivable in the present context, and it will be understood that the present invention is not restricted to any particular service, but includes all services that can be performed with the aid of telephone technology.

It will also be evident that new services can be created very easily with the aid of existing transactions, by combining these transactions in a novel way and/or by creating one or more novel transactions that are added to the many transactions that are already available.

The problem recited in the introduction with respect to each service requiring a separate data program at present is thus one of the problems solved by the present invention.

When a subscriber wishes to order a standard service, he/she is able to order the service by pressing the appropriate buttons on his/her telephone, in the same way as with service selection procedure performed in Sweden in the fixed network. A standard service can also be ordered by the subscriber contacting the operator of the computer system.

When wishing to order a special service, the subscriber must contact the operator who, therewith, updates the second database 3 containing the service profile, via a terminal 7 with associated keyboard 8 or the like. The operator thus states the transactions required to perform the service through its codes.

When the special service requires new transactions, these transactions are created by programming and allocated codes and thereafter inserted into the first database 2.

Although the invention has been described with reference to a number of exemplifying embodiments, it will be understood that the skilled person will be able to configure different parts in other ways but with the same function. For instance, the two databases may be a single database or several different databases, the computer system may include multi-processor systems in several computers, coding of the transactions can be effected in different ways, and so on.

The present invention is therefore not restricted to the aforedescribed exemplifying embodiments thereof, since modifications can be made within the scope of the following claims.

What is claimed is:

1. A method of providing and performing a telephone service, in which a calling subscriber number is sensed by a computer system, and wherein the computer system is constructed to perform a telephone service ordered by a subscriber of the subscriber number in accordance with a data program, the computer system comprising: a storage device which is caused to contain a predetermined number of transactions in the form of parts of a data program; wherein the computer system fetches from the storage device a number of transactions which are combined together to form a data program for defining and performing said service; wherein when the subscriber orders a service, the service is stored in the form of codes that correspond to certain transactions from a multitude of transactions; wherein said codes are stored in affiliation with the subscriber number; and, wherein when the subscriber number is sensed, or read, the computer system fetches said transactions through the medium of said codes and executes said transactions thereby perform said service.

2. A method according to claim 1, wherein when the subscriber number is sensed, the computer analyzes the service profile to which the subscriber number belongs.

3. A method according to claim 2, wherein said transactions include program instructions or program statements.

4. A method according to claim 2, wherein said transactions include information that does not constitute program instructions or program statements.

5. A method according to claim 2, wherein said one or more services include one or more time windows within which the service is different to the service within remaining time windows.

6. A method according to claim 1, wherein when the subscriber number is sensed, the computer system analyzes the service profile that belongs to an individual code given by the user to the computer system.

7. A method according to claim 6, wherein said transactions include program instructions or program statements.

8. A method according to claim 6, wherein said transactions include information that does not constitute program instructions or program statements.

9. A method according to claim 6, wherein said one or more services include one or more time windows within which the service is different to the service within remaining time windows.

10. A method according to claim 1, wherein said transactions include program instructions or program statements.

11. A method according to claim 10, wherein said transactions include information that does not constitute program instructions or program statements.

12. A method according to claim 10, wherein said one or more services include one or more time windows within which the service is different to the service within remaining time windows.

13. A method according to claim 1, wherein said transactions include information that does not constitute program instructions or programs statements.

14. A method according to claim 13, wherein said transactions contain speech information which can be listened to by the subscriber or some other in the execution of the service.

15. A method according to claim 13, wherein said one or more services include one or more time windows within which the service is different to the service within remaining time windows.

16. A method according to claim 14, wherein said one or more services include one or more time windows within which the service is different to the service within remaining time windows.

17. A method according to claim 1, wherein said service includes one or more services including one or more time windows within which the service is different from the service within remaining time windows.

18. A method of providing and performing a telephone service, in which a calling subscriber number is sensed by a computer system, and wherein the computer system is constructed to perform a telephone service ordered by a subscriber of the subscriber number in accordance with a data program, the computer system comprising: a storage device which is caused to contain a predetermined number of transactions in the form of parts of a data program; wherein the computer system fetches from the storage device a number of transactions which are combined together to form a data program for defining and performing said service; in which transactions constitute program instructions which, in coaction with a superordinate data program, cause at least one of the programs defined by the transactions to be executed, wherein when the subscriber orders a service, the service is stored in the form of codes that correspond to certain transactions from a multitude of transactions; wherein said codes are stored in affiliation with the subscriber number; and, wherein when the subscriber number is sensed, or read, the computer system fetches said transactions through the medium of said codes and executes said transactions thereby perform said service.

* * * * *